US008687685B2

(12) United States Patent
Coban et al.

(10) Patent No.: US 8,687,685 B2
(45) Date of Patent: Apr. 1, 2014

(54) EFFICIENT TRANSCODING OF B-FRAMES TO P-FRAMES

(75) Inventors: Muhammed Z. Coban, San Diego, CA (US); Marta Karczewicz, San Diego, CA (US); Rahul P. Panchal, San Diego, CA (US); Seyfullah H Oguz, San Diego, CA (US); Amit Rohatgi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 295 days.

(21) Appl. No.: 12/759,563

(22) Filed: Apr. 13, 2010

(65) Prior Publication Data

US 2010/0260262 A1 Oct. 14, 2010

Related U.S. Application Data

(60) Provisional application No. 61/169,210, filed on Apr. 14, 2009.

(51) Int. Cl.
*H04N 7/12* (2006.01)
*H04B 1/66* (2006.01)

(52) U.S. Cl.
USPC ..................................... 375/240; 375/E7.243

(58) Field of Classification Search
None
See application file for complete search history.

(56) References Cited

U.S. PATENT DOCUMENTS

| | | |
|---|---|---|
| 6,507,618 B1 | 1/2003 | Wee et al. |
| 6,553,150 B1 | 4/2003 | Wee et al. |
| 6,618,442 B1 | 9/2003 | Chen et al. |
| 6,625,320 B1 | 9/2003 | Nilsson et al. |
| 6,904,094 B1 | 6/2005 | Liu et al. |
| 6,959,042 B1 | 10/2005 | Liu et al. |
| 6,961,376 B2 | 11/2005 | Wu et al. |
| 6,970,510 B1 | 11/2005 | Wee et al. |
| 6,973,130 B1 | 12/2005 | Wee et al. |
| 7,006,572 B2 | 2/2006 | Porikli et al. |
| 7,023,924 B1 | 4/2006 | Keller et al. |
| 7,039,115 B1 | 5/2006 | Wu |

(Continued)

FOREIGN PATENT DOCUMENTS

TW   I293228 B    2/2008

OTHER PUBLICATIONS

Siu et al, "On Transcoding a B-Frame to a P-Frame in the Compressed Domain", IEEE Transactions on Multimedia, vol. 9, No. 6, Oct. 2007, pp. 1093-1002.*

(Continued)

*Primary Examiner* — Jay Patel
*Assistant Examiner* — Reza Aghevli
(74) *Attorney, Agent, or Firm* — John Rickenbrode; Brent Boyd

(57) ABSTRACT

Techniques are described for efficient transcoding from a first format that supports I-units, P-units and B-units to a second format that supports I-units and P-units but does not support the B-units. In particular, techniques are described for converting B-frames or B-slices of the first format into P-frames or P-slices of the second format. The techniques avoid the need to decode and re-encode that frames or slices. Instead, residuals associated with the B-video blocks in the first format are augmented and made to be dependent upon only one of the two lists associated with the B-video blocks so that such B-video blocks in the first format can be redefined as P-video blocks in the second format.

52 Claims, 4 Drawing Sheets

(56) References Cited

U.S. PATENT DOCUMENTS

| | | | |
|---|---|---|---|
| 7,046,677 | B2 | 5/2006 | Monta et al. |
| 7,123,658 | B2 | 10/2006 | Krishnamachari |
| 7,133,452 | B1 | 11/2006 | Rault |
| 7,159,233 | B2 | 1/2007 | Son et al. |
| 7,218,842 | B1 | 5/2007 | Zhang et al. |
| 7,227,894 | B2 | 6/2007 | Lin et al. |
| 7,251,275 | B2 | 7/2007 | Wu et al. |
| 7,327,784 | B2 | 2/2008 | Rault |
| 7,330,509 | B2 | 2/2008 | Lu et al. |
| 7,391,809 | B2 | 6/2008 | Li et al. |
| 7,480,333 | B2 | 1/2009 | Rault |
| 7,492,387 | B2 | 2/2009 | Yang et al. |
| 2001/0031003 | A1 | 10/2001 | Sawhney et al. |
| 2002/0047899 | A1 | 4/2002 | Son et al. |
| 2002/0072882 | A1 | 6/2002 | Kruger et al. |
| 2002/0131496 | A1 | 9/2002 | Vasudevan et al. |
| 2002/0136298 | A1 | 9/2002 | Anantharamu et al. |
| 2002/0157112 | A1 | 10/2002 | Kuhn |
| 2002/0186769 | A1 | 12/2002 | O'Brien |
| 2003/0009764 | A1 | 1/2003 | Krishnamachari |
| 2003/0169817 | A1 | 9/2003 | Song et al. |
| 2003/0206590 | A1 | 11/2003 | Krishnamachari |
| 2003/0210744 | A1 | 11/2003 | Porikli et al. |
| 2003/0233464 | A1 | 12/2003 | Walpole et al. |
| 2003/0235220 | A1 | 12/2003 | Wu et al. |
| 2003/0235247 | A1 | 12/2003 | Wu et al. |
| 2003/0236904 | A1 | 12/2003 | Walpole et al. |
| 2004/0064259 | A1 | 4/2004 | Haaland et al. |
| 2004/0160960 | A1 | 8/2004 | Monta et al. |
| 2004/0179597 | A1 | 9/2004 | Rault |
| 2005/0043902 | A1 | 2/2005 | Haaland et al. |
| 2005/0058197 | A1 | 3/2005 | Lu et al. |
| 2005/0094965 | A1 | 5/2005 | Chen et al. |
| 2005/0147163 | A1 | 7/2005 | Li et al. |
| 2005/0152675 | A1 | 7/2005 | Hanes |
| 2005/0185714 | A1 | 8/2005 | Lin et al. |
| 2005/0201463 | A1* | 9/2005 | Lee et al. ............ 375/240.16 |
| 2005/0231588 | A1 | 10/2005 | Yang et al. |
| 2005/0249285 | A1 | 11/2005 | Chen et al. |
| 2006/0013320 | A1 | 1/2006 | Oguz et al. |
| 2006/0047967 | A1 | 3/2006 | Akhan et al. |
| 2006/0165088 | A1 | 7/2006 | Monta et al. |
| 2006/0218611 | A1 | 9/2006 | Son et al. |
| 2006/0280247 | A1* | 12/2006 | Chiou et al. ............ 375/240.16 |
| 2007/0058713 | A1 | 3/2007 | Shen et al. |
| 2007/0058718 | A1 | 3/2007 | Shen et al. |
| 2007/0074266 | A1 | 3/2007 | Raveendran et al. |
| 2007/0081586 | A1 | 4/2007 | Raveendran et al. |
| 2007/0081587 | A1 | 4/2007 | Raveendran et al. |
| 2007/0081588 | A1 | 4/2007 | Raveendran et al. |
| 2007/0091883 | A1 | 4/2007 | Wee et al. |
| 2007/0091884 | A1 | 4/2007 | Wee et al. |
| 2007/0091926 | A1 | 4/2007 | Apostolopoulos et al. |
| 2007/0091927 | A1 | 4/2007 | Apostolopoulos et al. |
| 2007/0091928 | A1 | 4/2007 | Wee et al. |
| 2007/0092004 | A1 | 4/2007 | Ho |
| 2007/0104097 | A1 | 5/2007 | Rassool et al. |
| 2007/0127881 | A1 | 6/2007 | Iwamura |
| 2007/0153916 | A1 | 7/2007 | Demircin et al. |
| 2007/0201500 | A1 | 8/2007 | Deshpande |
| 2007/0201554 | A1 | 8/2007 | Sihn |
| 2008/0056297 | A1 | 3/2008 | Gaur et al. |
| 2008/0056354 | A1 | 3/2008 | Sun et al. |
| 2008/0107185 | A1 | 5/2008 | Lefol et al. |
| 2008/0112483 | A1 | 5/2008 | Lu et al. |
| 2008/0134258 | A1 | 6/2008 | Goose et al. |
| 2008/0212680 | A1 | 9/2008 | Rault |
| 2008/0282299 | A1 | 11/2008 | Koat et al. |

OTHER PUBLICATIONS

Sorial et al, Selective Requantization for Transcoding of MPEG Compressed Video, Proc. IEEE Int. Conf. Multimedia and EXpo, 2000, pp. 217-220.*

Draft ITU-T Recommendation and Fimna; Draft International Standard of Joint Video Specification (ITU-T Rec. H.264 | ISO/IEC 14496-10 AVC), Geneva, May 27, 2003, pp. 198-199.*

Wiegand et al, "Overview of the H.264/AVC Video Coding Standard", IEEE Transactions on Circuits and Systems for Video Technology, vol. 13, No. 7, Jul. 2003, pp. 560-576.*

Acharya et al., "Compressed Domain Transcoding of MPEG," 1998 IEEE International Conference on Multimedia Computer and Systems, Austin, TX, Jun. 28-Jul. 1, pp. 1-20.

Feamster, N., "Development of a Transcoding Algorithm from MPEG to H.263," Hewlett Packard Power Point Presentation, Jan. 26, 1998, pp. 1-19, http://nms.lcs.mit.edu/~feamster/papers/talks/spie99.ppt.

Jafari et al., "An Efficient Video Transcoding Algorithm Between H.263 and MPEG-4 for Inter-Network Communications," 4 pp.

Siu et al., "On Transcoding a B-Frame to a P-Frame in the Compressed Domain," IEEE Transactions on Multimedia, vol. 9, No. 6, Oct. 2007, pp. 1093-1102.

Chan Y. L., et al., "Low-Complexity and High-Quality Frame-Skipping Transcoder f o r Continuous Presence Multipoint Video Conferencing," IEEE Transactions on Multimedia, IEEE Service Center, 2004, vol. 6, 31-46.

International Search Report and Written Opinion—PCT/US2010/031094, International Search Authority—European Patent Office—Sep. 24, 2010.

Shih-Fu Chang; Messerschmitt D G: Manipulation and compositing o f MC-DCT compressed video I E E E Journal on Selected Areas in Communications, vol. 13, No. 1, Jan. 1995 (1995-OI), pp. 1-11, XP002596693 ISSN: 0733-8716 DO1 : 10.1109/49.363151 the wh.

Stijn Notebaert et al., "Mixed architetures f o r H. 264/AVC digital video transrating," Multimedia Tools and Applications, 2009, vol. 44, Kluwer Academic Publishers, 39-64.

Yuan W, Rate control scheme f o r H. 264/AVCW ITU Study Group 16—Video Coding Experts Group—ISO/IEC MPEG & ITU-T VCEG(ISO/IEC JTCI/SC29/WG11 and ITU-T SG16 Q6), No. JVT-0016, Apr. 16, 2005, XP030005964 p. 2-p. 4.

Taiwan Search Report—TW099111864—TIPO—Apr. 23, 2013.

* cited by examiner

EFFICIENT TRANSCODING OF B-FRAMES TO P-FRAMES

This application claims the benefit of U.S. Provisional Application No. 61/169,210 filed on Apr. 14, 2009, the entire content of which is incorporated herein by reference.

TECHNICAL FIELD

The disclosure relates to video encoding and, more particularly, transcoding of video content from one encoded format to another encoded format.

BACKGROUND

Digital multimedia capabilities can be incorporated into a wide range of devices, including digital televisions, digital direct broadcast systems, wireless communication devices, wireless broadcast systems, personal digital assistants (PDAs), laptop or desktop computers, digital cameras, digital recording devices, video gaming devices, video game consoles, cellular or satellite radio telephones, digital media players and the like. Digital multimedia devices may implement video coding techniques, such as MPEG-2, ITU-H.263, MPEG-4, or ITU-H.264/MPEG-4 Part 10, Advanced Video Coding (AVC), to transmit and receive or store and retrieve digital video data more efficiently. Video encoding techniques may perform video compression via spatial and temporal prediction to reduce or remove redundancy inherent in video sequences.

In video encoding, the compression often includes spatial prediction, motion estimation and motion compensation. Intra-coding relies on spatial prediction and transform coding, such as discrete cosine transform (DCT), to reduce or remove spatial redundancy between video blocks within a given video frame. Inter-coding relies on temporal prediction and transform coding to reduce or remove temporal redundancy between video blocks of successive video frames of a video sequence. Intra-coded frames ("I-frames") are often used as random access points as well as references for the inter-coding of other frames. I-frames, however, typically exhibit less compression than other frames. The term I-units may refer to I-frames, I-slices or other independently decodable portions of an I-frame.

For inter-coding, a video encoder performs motion estimation to track the movement of matching video blocks between two or more adjacent frames or other coded units, such as slices of frames. Inter-coded frames may include predictive frames ("P-frames"), which may include blocks predicted from a previous frame, and bidirectional predictive frames ("B-frames"), which may include blocks predicted from a previous frame and a subsequent frame of a video sequence. The terms P-frames and B-frames are somewhat historic in the sense that early coding techniques limited prediction in specific directions. Some newer coding formats and standards do not limit the prediction direction of P-frames or B-frames Consistent with newer video standards such as ITU H.264, for example, B-video blocks may be predicted from two different lists which do not necessarily need to be "bi-directional." In other words, B-video blocks may be predicted from two lists of data, which may correspond to data from two previous frames, two subsequent frames, or one previous frame and one subsequent frame. In contrast, P-video blocks are predicted based on one list, i.e., one data structure, which may correspond to one predictive frame, e.g., one previous frame or one subsequent frame. B-frames and P-frames may be more generally referred to as P-units and B-units. P-units and B-units may also be realized in smaller coded units, such as slices of frames or portions of frames. B-units may include B-video blocks, P-video blocks or I-video blocks. P-units may include P-video blocks or I-video blocks. I-units may include only I-video blocks.

For P- and B-video blocks, motion estimation generates motion vectors, which indicate the displacement of the video blocks relative to corresponding prediction video blocks in predictive frame(s) or other coded units. Motion compensation uses the motion vectors to generate prediction video blocks from the predictive frame(s) or other coded units. After motion compensation, a residual video block is formed by subtracting the prediction video block from the original video block to be coded. The video encoder usually applies transform, quantization and entropy coding processes to further reduce the bit rate associated with communication of the residual block. I- and P-units are commonly used to define reference blocks for the inter-coding of P- and B-units.

Transcoding is generally a process of converting video content from one encoded format to another encoded format. For example, video content may be transcoded from an ITU-H.263 format to an ITU-H.264 format or from the ITU-H.264 format to the ITU-H.263 format. Transcoding is commonly used to allow a broadcast device or other device, to effectively communicate video content encoded in one format to a device that supports another format. Unfortunately, conventional transcoding is often very computationally intensive. For example, the encoded video content may need to be decoded from the first format and then re-encoded in the second format, which may require extensive amounts of video processing for every frame of a video sequence.

SUMMARY

This disclosure describes techniques for efficient transcoding from a first format that supports I-units, P-units and B-units to a second format that supports I-units and P-units but does not support the B-units. In particular, this disclosure provides techniques for converting B-frames or B-slices of the first format into P-frames or P-slices of the second format.

The techniques avoid the need to decode and re-encode the frames or slices. Instead, residuals associated with the B-video blocks in the first format are augmented and made to be dependent upon only one of the two lists associated with the B-video blocks so that such B-video blocks in the first format can be redefined as P-video blocks in the second format.

Additional transcoding techniques are also described for modifying I-video blocks of the first format to I-video blocks of the second format, particularly if the I-video blocks are encoded in the first format based on spatially adjacent B-video blocks. In this case, converting the B-video blocks to P-video blocks may affect the spatial prediction of the I-video blocks. P-video blocks and I-video blocks that are not spatially adjacent B-video blocks may remain unchanged in the transcoding process.

In one example, a method comprises receiving encoded video content that includes a first set of coded units comprising I-units, P-units and B-units, and transcoding the encoded video content into transcoded video content that includes a second set of coded units comprising I-units and P-units. The transcoded video content may then be stored or output to one or more other devices. Transcoding includes converting the B-units in the first set into one or more of the P-units in the second set. Furthermore, for one or more of the B-units in the first set, converting includes eliminating temporal predictions to one of two lists associated with a B-video block, generating an augmented residual block, and adding the augmented residual block to original residual block associated with the B-video block to define a residual block for a P-video block. The augmented residual block is based on a difference between a first reference video block from a first one of the two lists and a second reference video block from a second one of the two lists. For example, the residual block may comprise approximately half the difference.

In another example, this disclosure describes an apparatus comprising a receive module that receives encoded video content that includes a first set of coded units comprising I-units, P-units and B-units, and an encoder that transcodes the encoded video content into transcoded video content that includes a second set of coded units comprising I-units and P-units. In transcoding, the encoder converts the B-units in the first set into one or more of the P-units in the second set. Furthermore, for one or more of the B-units in the first set, in converting the B-units, the encoder eliminates temporal predictions to one of two lists associated with a B-video block, generates an augmented residual block, and adds the augmented residual block to original residual block associated with the B-video block to define a residual block for a P-video block. The augmented residual block is based on a difference between a first reference video block from a first one of the two lists and a second reference video block from a second one of the two lists.

In another example, this disclosure describes a device comprising means for receiving encoded video content that includes a first set of coded units comprising I-units, P-units and B-units, and means for transcoding the encoded video content into transcoded video content that includes a second set of coded units comprising I-units and P-units. The means for transcoding includes means for converting the B-units in the first set into one or more of the P-units in the second set. For one or more of the B-units in the first set, the means for converting includes means for eliminating temporal predictions to one of two lists associated with a B-video block, means for generating an augmented residual block, and means for adding the augmented residual block to original residual block associated with the B-video block to define a residual block for a P-video block. The augmented residual block is based on a difference between a first reference video block from a first one of the two lists and a second reference video block from a second one of the two lists.

The techniques described in this disclosure may be implemented at least partially in hardware, and may also implement software or firmware in combination with the hardware. If implemented partially in software, the software may be executed by a hardware device, such as a device comprising one or more processors, such as a microprocessor, application specific integrated circuit (ASIC), field programmable gate array (FPGA), or digital signal processor (DSP). The software that executes the techniques may be initially stored in a computer-readable storage medium and loaded and executed in the processor.

Accordingly, this disclosure also contemplates a computer-readable storage medium comprising instructions that upon execution cause a processor to upon receiving encoded video content that includes a first set of coded units comprising I-units, P-units and B-units, transcode the encoded video content into transcoded video content that includes a second set of coded units comprising I-units and P-units. In transcoding, the instructions cause the processor to convert the B-units in the first set into one or more of the P-units in the second set. For one or more of the B-units in the first set, in converting the B-units, the instructions cause the processor to eliminate temporal predictions to one of two lists associated with a B-video block, generate an augmented residual block, and add the augmented residual block to original residual block associated with the B-video block to define a residual block for a P-video block. The augmented residual block is based on a difference between a first reference video block from a first one of the two lists and a second reference video block from a second one of the two lists.

In some cases, the computer-readable storage medium may form part of a computer program product, which may be sold to manufacturers and/or used in a video transcoding device. The computer program product may include the computer-readable medium, and in some cases, may also include packaging materials.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

This disclosure describes techniques for efficient transcoding from a first format that supports I-units, P-units and B-units to a second format that supports I-units and P-units but does not support the B-units. In particular, this disclosure provides techniques for converting B-frames or B-slices of the first format into P-frames or P-slices of the second format. The techniques avoid the need to decode and re-encode that frames or slices. Instead, residuals associated with the B-video blocks in the first format are augmented and made to be dependent upon only one of the two lists associated with the B-video blocks so that such B-video blocks in the first format can be redefined as P-video blocks in the second format.

As one example, this disclosure may provide a useful technique for transcoding from the ITU H.264 Main standard, to an ITU H.264 Baseline standard. The techniques, however, may be applicable to a wide variety of transcoding between standards or formats, e.g., from any standard or format that supports I-units, P-units and B-units to any standard or format that supports I-units and P-units but does not support the B-units. The techniques may operate in a transform domain, e.g., a discrete cosine transform (DCT) domain, thereby avoiding the need to fully decode video blocks to the pixel domain during the transcoding process. For example, the techniques may process residual transform coefficients to support efficient transcoding.

Figure 1:
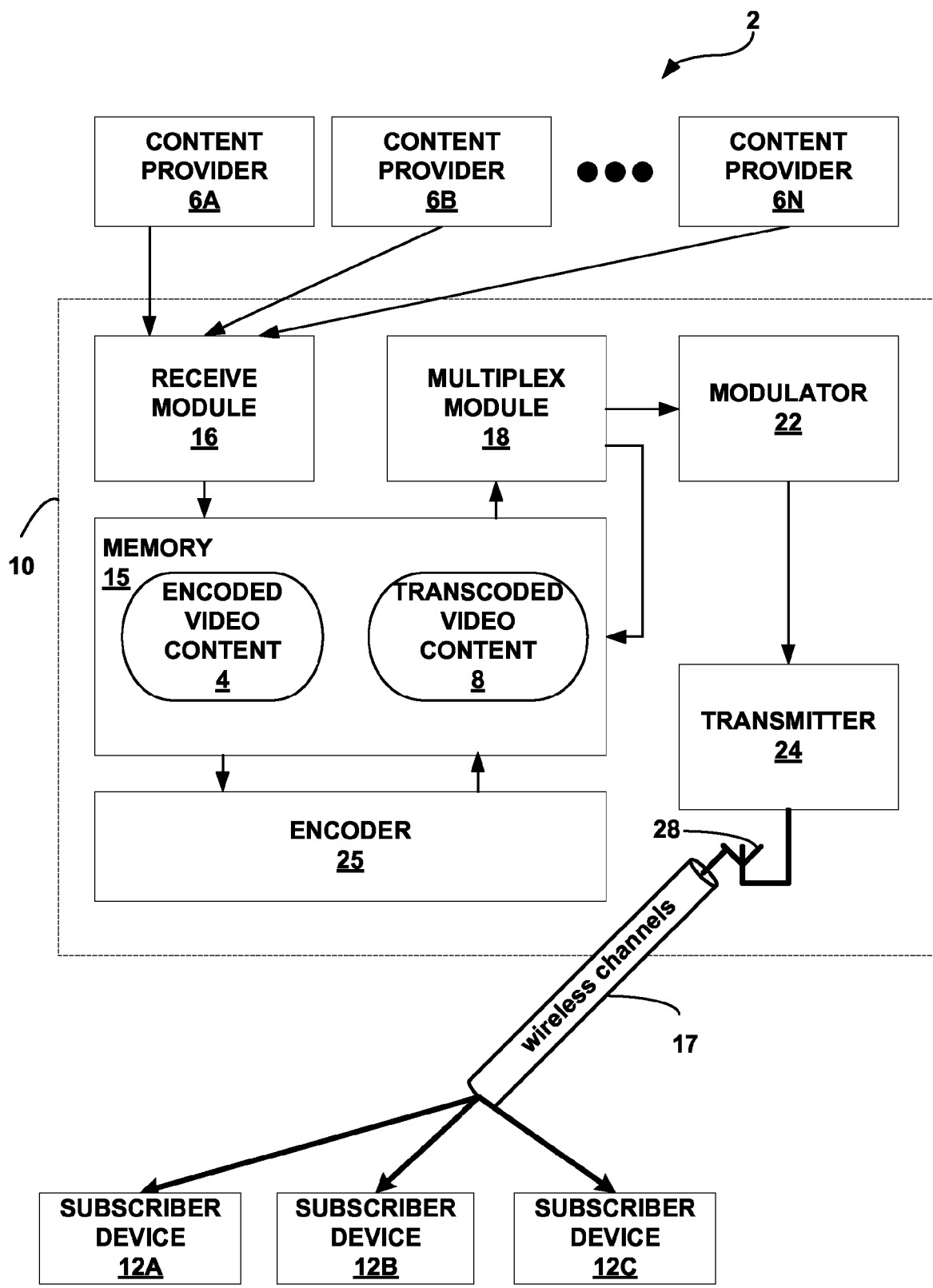
FIG. 1 is a block diagram illustrating an exemplary data encoding and communication system that can make use of the transcoding techniques of this disclosure.

FIG. 1 is a block diagram illustrating an exemplary system 2 that can make use of the techniques of this disclosure. System 2 is merely exemplary, as many other systems could also make use of the techniques described herein. System 2 in an example of a system that supports wireless broadcasting of multimedia content from an encoding device 10 to multiple subscriber devices 12A-12C. The techniques of this disclosure are particularly useful to such broadcast systems, but could also apply to other devices or systems. In general, the techniques of this disclosure may be applicable in any setting where transcoding is used.

System 2 of FIG. 1 may support multimedia broadcasting. Multimedia broadcasting techniques include those referred to as Forward Link Only (FLO), Digital Multimedia Broadcasting (DMB), and Digital Video Broadcasting-Handheld (DVB-H). Digital multimedia broadcasting may deliver content to many subscriber devices 12A-12C as a series of broadcast channels, providing a multimedia content selection experience similar to that of a conventional television. In this example, each broadcast channel may carry digital data comprising encoded audio/video streams, audio/video clips, or other informational content. The digital broadcast channels may be delivered simultaneously on a multicast basis from device 10 to multiple subscriber devices 12A-12C. Subscriber devices 12A-12C may comprise mobile wireless subscriber units (such as mobile handsets or so-called multimedia "cell phones"). Each of mobile wireless subscriber units 12A-12C receives the digital broadcast, and may tune to a particular channel for presentation to the user. In order to switch channels, a respective subscriber unit acquires the digital data from a different channel and decodes the data to present the different content to the user.

Again, system 2 is merely exemplary. The techniques described herein could be used in any system that supports transcoding. In system 2, a number of content service providers 6A-6N (collectively content service providers 6) provide encoded video content to device 10. Receive module 16 facilitates the reception of encoded video content by device 10. Receive module 16 stores encoded video content 4 in memory 15 upon reception. Device 10 may then transcode such encoded video content 4 from a first format to a second format in order to support broadcasting of the content in the second format. During such transcoding, device 10 may implement the techniques of this disclosure.

In particular, encoder 25 of device 10 may comprise a transcoder that receives encoded video content 4 from memory 15 and transcodes encoded video content 4 into transcoded video content 8. During this transcoding process, encoder 25 may change B-video blocks of encoded video content 4 into P-video blocks of transcoded video content 8. In making this change from B-video blocks to P-video blocks, the B-video blocks in a first format associated with encoded video content 4 are augmented and made to be dependent upon only one of the two lists associated with the B-video blocks. In this way, such B-video blocks in the first format associated with encoded video content 4 can be redefined as P-video blocks in the second format associated with transcoded video content 8.

In some cases, encoder 25 may also support conventional encoding of non-encoded video content (not shown) into the encoded video content 4. For example, receive module 16 may also receive non-encoded video content (not shown), and in this case, encoder 25 may simply encode the received content into the desired format. The techniques of this disclosure, however, concern the case where encoder 25 performs transcoding from one encoded format to another encoded format. The techniques of this disclosure may simplify this transcoding process, and may allow for conversion of B-video blocks into P-video blocks in a transform domain, e.g., a discrete cosine transform (DCT) domain.

Device 10 may facilitate the wireless broadcasting of the multimedia content. Encoder 25 of device 10 may encode many channels of multimedia content. Encoder 25 may comprise a single module, or may comprise several different encoder modules that handle different channels of multimedia content. For example, encoder 25 may encode a plurality of different services or content that includes one or more flows of multimedia data. Encoded video content 4 and transcoded video content 8 may include a wide variety of content associated with many different broadcast channels or flows.

Multiplex module 18 may combine the encoded channels or flows into a multicast. The encoded channels or flows may include multimedia content or services such as news, sports, weather, financial information, movies, and/or applications, programs, scripts, software, video games, or any other type of suitable content or service. In one aspect of this disclosure, device 10 encodes, combines, and transmits portions of the flows of multimedia data received over a period of time.

As an example, device 10 may operate on the flows on a per second basis. For example, device 10 may encode one-second segments of multimedia data of the plurality of flows or channels, combine the one-second segments of multimedia data to form a superframe of data, and transmit the superframe over wireless channels 17 via a transmitter 24. As used herein, the term "superframe" refers to a group of segments of multimedia data collected over a time period or window, such as a one second time period or window. The segments of multimedia data may include one or more frames of video or audio-video data. Superframes could also be defined to cover larger or smaller time intervals than one-second periods, or even variable time intervals.

Multiplex module 18 may provide feedback to encoder module 16, which in some cases, may include re-encode requests. In this way, multiplex module 18 may adjust the encoding rate applied to one or more specific channels by encoder module 16 in order to make efficient use of the available wireless bandwidth of wireless channels 17. Multiplex module 18 may analyze the encoded video content and compare the amount of bandwidth needed to transmit such content to the available bandwidth on wireless channels 17. If needed, multiplex module 18 may issue one or more re-encode requests to encoder module 16 to cause the coding bit rate to be reduced for one or more content streams. After multiplex module 18 creates the multicast, modulator 22 modulates the information according to a wireless physical layer modulation scheme. Transmitter 24 transmits the multicast to subscriber devices 12A-12C over wireless channels 15 via one or more antennas 28.

Wireless channels 17 may operate according to any wireless protocol, and may have a fixed bandwidth. As an example, wireless channels 17 may operate according to terrestrial mobile multimedia multicast (TM3) systems using the FLO Air Interface Specification, "Forward Link Only Air Interface Specification for Terrestrial Mobile Multimedia Multicast," to be published as Technical Standard TIA-1099 (the "FLO Specification"). The FLO Specification includes examples defining bitstream syntax and semantics and decoding processes suitable for the FLO Air Interface. Alternatively, video may be broadcasted over wireless channels 17 according to other standards such as DVB-H (digital video broadcast-handheld), ISDB-T (integrated services digital broadcast-terrestrial), or DMB (digital multimedia broadcasting), or according to one or more radio access technologies, such as Global System for Mobile Communications (GSM), code division multiple access (CDMA), CDMA 2000, wideband CDMA (W-CDMA), CDMA 1× Evolution-Data Optimized (EV-DO), frequency division multiple access (FDMA), orthogonal frequency division multiplexing (OFDM), time division multiple access (TDMA) or the broad family of standards developed to facilitate wireless networking defined by the various IEEE 801.11x standards.

As described in greater detail below, encoder 25 supports transcoding techniques. Encoder 25 may comprise a transcoder, or may comprise one or more encoders that include transcoding capabilities consistent with this disclosure. In general, encoder 25 fetches or receives encoded video content 4 that includes a first set of coded units comprising I-units, P-units and B-units. Encoder 25 transcodes the encoded video content 4 into transcoded video content 8 that includes a second set of coded units comprising I-units and P-units. Encoder 25 may output the transcoded video content 8 to memory 15 following the transcoding process.

According to the techniques of this disclosure, transcoding includes converting the B-units in the first set of coded units into one or more of the P-units in the second set of coded units. Moreover, in converting the B-units in the first set into the P-units in the second set, encoder 25 may eliminate temporal predictions to one of two lists associated with a B-video block, generate an augmented residual block, and add the augmented residual block to original residual block associated with the B-video block to define a residual block for a P-video block. In accordance with this disclosure, the augmented residual block may be based on a difference between a first reference video block from a first one of the two lists and a second reference video block from a second one of the two lists. For example, the augmented residual block may comprise approximately half of the difference. In this manner, the actual video data associated with the first reference video block from a first one of the two lists and the second reference video block from a second one of the two lists may be used to define the augmented residual block.

Figure 2:
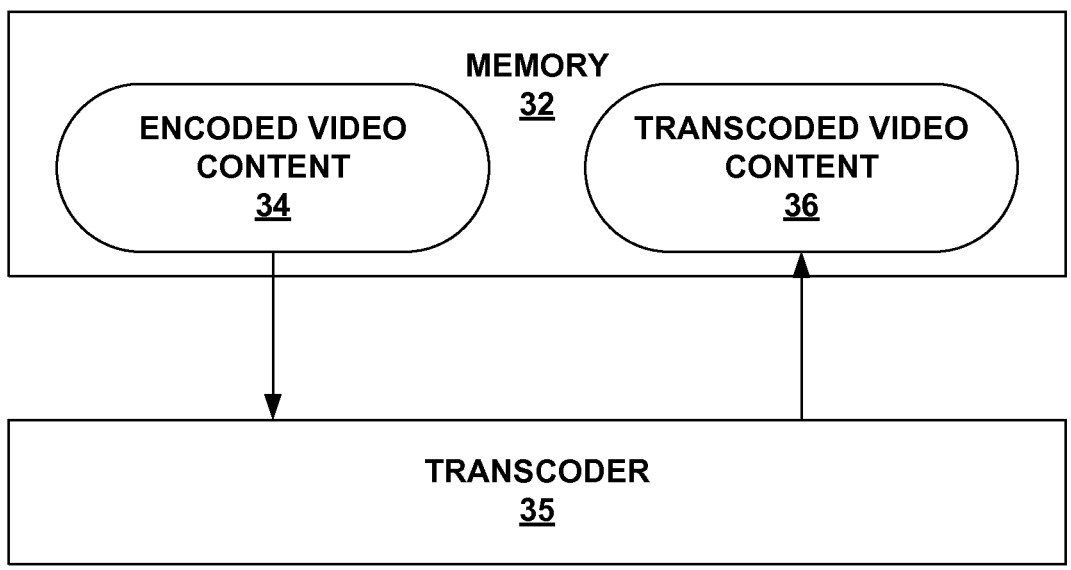
FIG. 2 is a block diagram of an exemplary transcoder and memory that may implement the transcoding techniques of this disclosure.

FIG. 2 is a block diagram illustrating a transcoder 35 coupled to memory 32 consistent with this disclosure. Transcoder 35 and memory 32 may correspond to encoder 25 and memory 15, or may correspond to components of a different system or device. Transcoder 35 may transcode encoded video content 34 into transcoded video content 36. In doing so, transcoder 35 may convert the data associated with encoded video content 34 into a different encoded format. In other words, transcoder 35 may convert encoded video content 34 in a first format into transcoded video content 36 in a second format.

Encoded video content 34 may include a first set of coded units comprising I-units, P-units and B-units. In contrast, transcoded video content 36 may include a second set of coded units comprising I-units and P-units. The second set of coded units may not include any B-units. In transcoding the encoded video content 34 into transcoded video content 36, transcoder may convert the B-units in the first set of coded units into one or more of the P-units in the second set of coded units. Furthermore, this transcoding may occur in a transform domain, e.g., the DCT domain. In this case, operating in the DCT domain may promote coding efficiency by avoiding the need to decode the encoded video content 34 to the pixel domain.

In converting the B-units in the first set into the P-units in the second set, transcoder 35 may eliminate temporal predictions to one of two lists associated with a B-video block, generate an augmented residual block, and add the augmented residual block to the original residual block associated with the B-video block to define a residual block for a P-video block. In this way, a B-video block that is predicted based on two different lists of predictive data is converted into a P-video block that is predicted based on only one list of predictive data. However, to account for the elimination of one of the lists of predictive data, an augmented residual block is generated. Transcoder 35 adds the augmented residual block to an original residual block associated with the B-video block to define a residual block for a P-video block.

In accordance with this disclosure, the augmented residual block is based on a difference between a first reference video block from a first one of the two lists and a second reference video block from a second one of the two lists. In one particular example, the residual block comprises approximately half the difference. In this manner, the actual video data associated with the first reference video block from a first one of the two lists and the second reference video block from a second one of the two lists may be used to define the augmented residual block. As an example in the transform domain, a difference value (or a set of difference values for each coefficient location of a transformed block) can be generated, where the difference value (or set of values) is indicative of the difference between a first reference video block (in the transform domain) and a second reference video block (in the transform domain), wherein the first reference block comes from a first one of the two lists and the second reference video block comes from a second one of the two lists. One-half of this difference value (or one-half of each difference value for each coefficient location of a transformed block) can then be defined as the augmented residual block.

In some cases, transcoder 35 may select the one of the two lists to be eliminated based on spatial proximity of video data in the lists relative to the B-video block. In this case, the one of the two lists to be eliminated may define first video data that is spatially further from the B-video block than second video data associated with a list used for the P-video block. Accordingly, in this case, the list with the data that is spatially closest to the video block that is being transcoded may be kept, and the list with data this is spatially further away from the video block that is being transcoded may be discarded.

In other cases, transcoder 35 may select the one of the two lists to be eliminated based on temporal proximity of video data in the lists relative to the B-video block. Accordingly, in this case, the list with the data that is temporally closest to the video block that is being transcoded may be kept, and the list with data this is temporally further away from the video block that is being transcoded may be discarded.

In still other cases, transcoder 35 may select the one of the two lists to be eliminated based on respective prediction values associated with the two lists. In this case, the prediction values associated with the two lists may comprise residual blocks of data associated with prediction based on each of the two lists. Alternatively, the prediction values may be the augmented residual blocks generated for each list, assuming that the list was used and the other list was discarded.

Transcoder 35 may define a level of quantization for the P-video block to be different than a level of quantization of the B-video block. In this case, transcoder 35 may change the level of quantization when converting the B-video block to the P-video block. Alternatively or additionally, transcoder 35 may define a level of quantization for the augmented residual block to be different than a level of quantization of the original residual block. In this manner, transcoder 35 may use quantization adjustments to refine the transcoding process. However, in this case, quantization adjustments may require data to be decoded all the way to the pixel domain. In the absence of quantization adjustments, the techniques of this disclosure may be performed in the transform domain.

The I-units, P-units and B-units comprise either video frames or slices of video frames. Thus, transcoder 35 may convert a first set of coded units comprising I-frames or I-slices, P-frames or P-slices, and B-frames or B-slices into a second set of coded units comprising only I-frames or I-slices, and P-frames or P-slices. The B-frames or B-slices in the first set are converted to P-frames or P-slices in the second set by eliminating one of the two predictions lists associated with B-video blocks, generating augmented residuals for the B-video blocks, and adding the augmented residuals to original residuals associated with the B-video blocks. The first set of coded units may comply with a first video coding standard that supports I-units, P-units and B-units, while the second set of coded units may comply with a second video coding standard that supports only I-units and P-units. As one example, the first video coding standard may comprise a main ITU-H.264 standard, and the second video coding standard may comprise a baseline ITU-H.264 standard.

Again, in one aspect of this disclosure, transcoder 35 may convert the B-units into one or more of the P-units within a transform domain. In particular, transcoder 35 may operate in a DCT domain for the conversion of B-video blocks of the B-units into P-video blocks of the P-units. In this case, the augmented residuals may be generated and added to the original residuals within the DCT domain. By operating in the DCT domain, the need to convert back to the pixel domain for video transcoding may be avoided, thereby avoiding complexity in the transcoding process. If quantization adjustments are desired, however, it may be necessary to make such quantization adjustments In some cases, in converting B-units in the first set into one or more of the P-units in the second set, transcoder 35 may also convert one or more I-video blocks within a given unit. In particular, any I-video block that is spatially predicted based on an unconverted B-video block may need to be converted to an I-video block that is spatial predicted based on converted P-video block. In this case, error propagation due to changes from B-video blocks to P-video blocks may be reduced or eliminated. Since the I-video block may have dependency upon data of a B-video block, if the B-video block is changed to a P-video block, then the I-video block that depends upon the original B-video block needs to change its dependency consistent with the change of the B-video block to the P-video block. In this case, any augments to the residual of the P-video block relative to the B-video block may need to be considered in the encoding of an adjacent I-video block.

Consistent with this disclosure, transcoder 35 may implement techniques that use the motion vector and macroblock mode information embedded in a B-slice bitstream for transcoding of B slices into P slices. In particular, transcoder 35 may use the mode and motion vector information of B-macroblocks (at most two motion vectors) to derive motion vector information for P-macroblocks (at most one motion vector) along with the extra prediction error introduced from the change in the prediction mode. The resulting extra prediction error can be added to the original prediction error present in the B-slice bitstream in the transform domain, and the data may be re-encoded. The amount of re-encoding error introduced by the techniques of this disclosure may be very minimal.

The motion vector used in coding of a P-macroblock corresponding to an explicitly or implicitly (skipped) B-macroblock is equal to one of the two available motion vectors (MVs), list 0 (L0) and list 1 (L1) motion vectors, in the B-macroblock. The extra prediction error resulting from use of one motion vector instead of two motion vectors for prediction can be obtained in transform domain by taking the difference of the two prediction modes and transforming and quantizing the difference. Any re-encoding error from transcoding of B-macroblocks may only be present for such B-macroblocks that use bi-predictive modes. For any B-macroblocks that use a single motion vector (MV L0 or MV L1) for the macroblock or its partitions, there would be no re-encoding error. In this case, the same prediction block can be replicated by a P prediction mode that uses the same motion vector that points to the same reference data.

In one aspect, the techniques implemented by transcoder 35 can be described by the following equations:

$$R'=R+Q[T[P-P']] \quad (1)$$

$$T^{-1}[Q^{-1}[R']]+P' \approx T^{-1}[Q^{-1}[R]]+P \quad (2)$$

In these equations, R is the residual error in the transform domain that is present in the bitstream for a B-macroblock, P is an M×N prediction block that corresponds to the prediction block for the B-macroblock, P' is the prediction block corresponding to the MV L0 or MV L1 (depending on which one is available and chosen) motion vector for a P-macroblock, and R' is the resulting new prediction error. T[ ] is the transform operator and Q[ ] is the quantization operator.

For B-macroblock modes that use either L0 or L1 prediction data for a partition or subpartition but not both, the prediction error associated with transcoded data may be equal to that of the original encoded data, i.e., R'=R, if the same motion vector that references the same frame is used for encoding of the B-macroblock and the converted P-macroblock. In this case, there is no need to modify the residual signal information.

However, for bi-predictive (two motion vectors) modes, the prediction blocks used in B-macroblocks and P-macroblocks become $P=(w_0 \cdot P_0+w_1 \cdot P_1)/2$, $P'=w_{0.1} \cdot P_{0.1}$ respectively. In this case, $P_0$ is the prediction from motion vector L0 and $P_1$ is the prediction from motion vector L1. The prediction weights may be represented by $w_0$ and $w_1$. For no weighted prediction, $w_0$ and $w_1$ are both equal to 1. The prediction difference P−P' can be directly computed in transcoder 35 by $P-P'=(w_0 \cdot P_0-w_1 \cdot P_1)/2$ if L1 motion vector is used as the P-macroblock motion vector and by $P-P=(w1 \cdot P_1-w_0 \cdot P_0)/2$ if L0 motion vector is used as the P-macroblock motion vector.

In some cases, explicitly or implicitly signaled B-macroblock and sub-macroblock types can be mapped into P-macroblock and sub-macroblock types according to their macroblock and sub-macroblock prediction modes (PredMode). PredModes for macroblocks, macroblock partitions or sub-macroblock partitions that are not bi-prediction modes may be mapped into Pred_L0, and reference list index of reference frames in the reference frame list may be modified to refer to the corresponding frame. Basically, P-macroblocks can use the same prediction block as the B-macroblocks, hence the prediction error difference will be zero if only one list is used for the B-macroblocks. In this case, there is no need to modify the prediction residual error information, i.e., R'=R, in the B-macroblock bitstream. All that is needed is to encode the motion vector used in the B-macroblock prediction, modify the reference frame index (refIdx) and send the encoded residual signal as it is. As an example, if mb_type=B_L0_L1__16×8, $Ref_0[0]$=N, $Ref_0[0]$=N+1, refIdx_L0[0]=refIdx_L1[1]=0, the corresponding P-macroblock will have mb_type=P_L0_L0__16×8, refIdx_L0[0]=1 and refIdx_L0[1]=0 with motion vector corresponding to L1 prediction, assuming reference frame list is $Ref_0[0]$=N+1, $Ref_0[1]$=N.

In the transcoding of the bi-predictional macroblocks or sub-macroblocks to their P counterparts, transcoder 35 may use one of the two motion vectors used in the prediction of blocks in the original B-macroblock. Transcoder 35 may select the best motion vector between the two possible motion vectors of the B-macroblock by comparing the prediction error (reconstructed block−prediction block) resulting from use of the candidate motion vectors. Transcoder 35 may select the motion vector resulting in the lowest prediction error, and may eliminate the other motion vector as described herein. However, this requires reconstruction of the B-blocks in the pixel domain. Accordingly, in order to avoid this additional complexity for motion vector selection, the motion vector that points to the temporally closest frame can be chosen by transcoder 35 without any need to reconstruct the B-blocks in pixel domain.

Regardless of how the motion vector is chosen, once the motion vector is chosen, the same procedure as described for non bi-predictives modes above can be used for coding the motion vector, macroblock type and the reference index information. As an example, for mb_type=B_L0_Bi_16×8, $Ref_0[0]=N$, $Ref_1[0]=N+1$, refIdx_L0[0]=refIdx_L1[1]=0, the corresponding P-macroblock may have mb_type= P_L0_L0_16×8, refIdx_L0[0]=1 and refIdx_L0[1]=0, with a motion vector corresponding to the L1 prediction, assuming reference frame list is $Ref_0[0]=N+1$, $Ref_0[1]=N$. If a motion vector corresponding to the L0 prediction is chosen, then refIdx_L0[0]=refIdx_L0[1]=1.

For transcoding of intra I-macroblocks in B-slices, transcoder 35 may perform one of two approaches. The first approach is to bypass transcoding, and hence, perform no modification to the mode or residual data of I-macroblocks. However, this could lead to possible undesired artifacts resulting from the mismatch of pixel values used for intra prediction for the B-slice and the transcoded P-slice. Accordingly, in order to minimize the artifacts, the difference between the prediction block of the B-slice intra macroblock or block partition and the prediction block of the P-slice intra macroblock or block partition may be coded. This difference between the intra prediction blocks exists when one or more of the neighboring macroblock or block partitions have bi-predictive prediction mode. The approach taken by transcoder 35, in this case, may be similar to that taken in transcoding of bi-prediction modes. The meanings of P and P' blocks in this case correspond to the intra prediction block resulting from neighboring pixels in the B-slice and transcoded P-slice, respectively. There is, of course, no motion information in this case. The prediction modes of the intra macroblocks in B-slices may not be changed.

Once the modes are determined, motion vectors, reference indices, and residual error signals may be re-encoded according to the H.264 (AVC) syntax. I- and P-type slices may be re-used without any modifications. The original encoding order of the slices and the reference types of the frames may not be modified consistent with the transcoding techniques of this disclosure.

As an example, transcoder 35 may convert B-Slices to P-Slices, which includes BiPredicted macroblocks to macroblocks that are predicted based on one list. If the residual value is given by:

$$oriMB - \left(\frac{forwMB + backMB}{2}\right) = res,$$

prior to transform and quantization, and:

$$\left(\frac{forwMB + backMB}{2}\right) + \tilde{\tilde{res}} = \tilde{\tilde{oriMB}}$$

after transform and quantization where $\tilde{\tilde{res}}= T^{-1}[Q^{-1}(Q(T[res]))]$, then $$Q(T[res])$$

may be coded into the bitstream, and
$T^{-1}[Q^{-1}(\ldots)]$ may take place at the decoder of a receiving device.

The equation:

$$\left(\frac{forwMB + backMB}{2}\right) + \tilde{\tilde{res}} = \tilde{\tilde{oriMB}}$$

may be re-written as:

$$forwMB + \left(\frac{backMB - forwMB}{2}\right) + \tilde{\tilde{res}} = \tilde{\tilde{oriMB}},$$

and by letting:

$$resAux = \left(\frac{backMB - forwMB}{2}\right) \text{ and}$$

$$\tilde{\tilde{resAux}} = T^{-1}\left[Q^{-1}\left(Q\left(T\left[\frac{backMB - forwMB}{2}\right]\right)\right)\right], \text{ one can derive:}$$

$$\tilde{\tilde{oriMB}} \cong forwMB + \tilde{\tilde{resAux}} + \tilde{\tilde{res}}$$
$$= \ldots$$
$$= forwMB + T^{-1}\left[Q^{-1}\left(Q\left(T\left[\frac{backMB - forwMB}{2}\right]\right)\right)\right] +$$
$$T^{-1}[Q^{-1}(Q(T[res]))]$$
$$\cong forwMB + T^{-1}\left[Q^{-1}\left(Q\left(T\left[\frac{backMB - forwMB}{2}\right]\right) + Q(T[res])\right)\right]$$
$$= forwMB + resAug \cong \tilde{\tilde{oriMB}}$$

This equation may be viewed as the form for forward-only prediction, wherein resAug is an augmented residual and:

$$Q\left(T\left[\frac{backMB - forwMB}{2}\right]\right) + Q(T[res])$$

is a quantity that is coded into the bitstream.

No full decoding of B frames is required. For example, in a so-called "PBBP cadence at 24 frames per second" eight I- or P-reference frames may need to be fully decoded and sixteen B-frames may be processed in the transform domain. The resAux=((backMB−forwMB)/2) is typically a low power signal. If necessary, there may be other ways to improve the accuracy of the approximation by changing the original quantization level. Furthermore, as described in the following section, the concept of augmented residuals can be further generalized to eliminate L1 reference dependency of L1-only (e.g., backward-only) predicted MBs in B slices.

In particular, for B-slices that are L1 predicted (e.g., backward predicted), macroblock transcoding to P-slices that are L0 predicted (e.g., forward predicted) macroblocks may occur according to the following example. L1 and L0, however, are not necessarily limited to any forward or backward prediction directions.

Let:

$$oriMB - (backMB) = res$$

prior to transform and quantization, and let $$(backMB) + \tilde{\tilde{res}} = \tilde{\tilde{oriMB}}$$

after quantization where:

$$\tilde{\tilde{res}} = T^{-1}[Q^{-1}(Q(T[res]))].$$

In this case,
Q(T[res]) is coded into the bitstream and
$T^{-1}[Q^{-1}(\ldots)]$ takes place in the decoder
The equation:

$$I(\text{back}MB) + \tilde{\text{res}} = \tilde{\text{ori}}MB$$

can be re-written as:

$$\text{forw}MB + (\text{back}MB - \text{forw}MB) + \tilde{\text{res}} = \tilde{\text{ori}}MB$$

where to avoid motion estimation in list L0, we let:

$$\text{forw}MB = \text{colocated } MB(\text{ref\_idx\_L0}=0)$$

Next, by letting:

$$\text{resAux} = (\text{back}MB - \text{forw}MB), \text{ and } \tilde{\text{res}}$$
$$\tilde{\text{Aux}} = T^{-1}[Q^{-1}(Q(T[\text{back}MB - \text{forw}MB]))]$$

one can obtain:

$$\tilde{\text{ori}MB} \cong \text{forw}MB + \text{res}\tilde{\text{Aux}} + \tilde{\text{res}} = \ldots$$
$$= \text{forw}MB + T^{-1}[Q^{-1}(Q(T[\text{back}MB - \text{forw}MB]))] +$$
$$T^{-1}[Q^{-1}(Q(T[\text{res}]))]$$
$$\cong \text{forw}MB + T^{-1}[Q^{-1}(Q(T[\text{back}MB - \text{forw}MB]) + Q(T[\text{res}]))]$$
$$= \text{forw}MB + \text{resAug} \cong \tilde{\text{ori}MB}$$

This is in the form of forward only prediction where for resAug (i.e., the augmented residual) Q(T[backMB−forwMB])+Q(T[res]) is the quantity that gets coded into the bitstream.

Again, full decoding of B frames is not required. With so-called "PBBP cadence at 24 frames per second," for example, eight I- or P-reference frames may need to be fully decoded and sixteen B-frames may be processed in the transform domain. The value of resAux=(backMB−forwMB) is expected to be a low power signal when motion is slow. Furthermore, at moderate to high motion, forwMB (colocated MB in ref_idx_L0=0) typically will no longer provide a good estimate. In this case, the inclusion of resAux may be expected to lead to some bandwidth expansion. This bandwidth expansion may be manageable, but if bandwidth expansion is unfeasible, Intra (4×4 or 16×16) coding or so-called "I_PCM" macroblock types may serve as coding alternatives to keep the bandwidth usage under control. In some cases, transcoder 35 may implement improvements to the accuracy of this approximation by changing the original quantization level, but this may require decoding of data all the way to the pixel domain, which may be undesirable in some instances.

Figure 3:
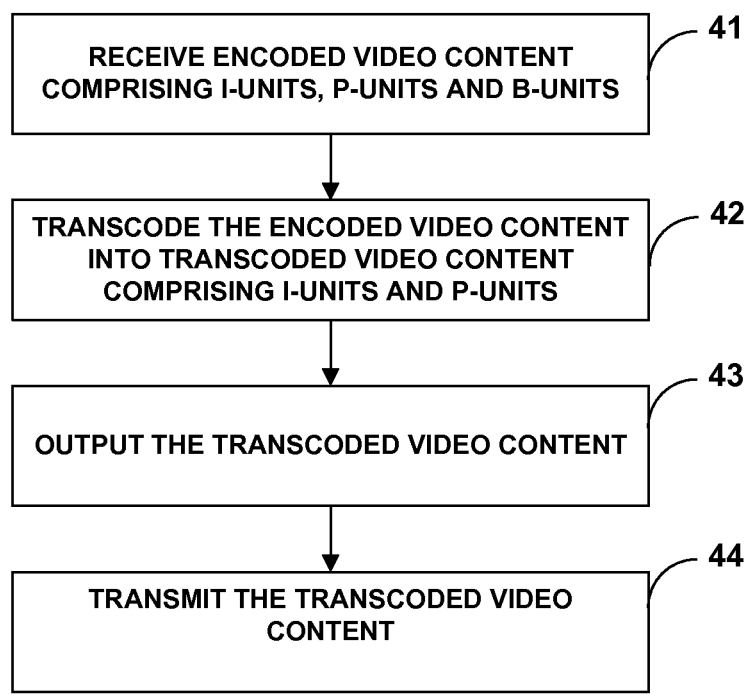
FIGS. 3 and 4 are flow diagrams illustrating exemplary techniques for transcoding video content consistent with this disclosure.

FIG. 3 is a flow diagram illustrating a technique that may be executed by transcoder 35 (FIG. 2), which may correspond to part of encoder 25 (FIG. 1). As shown, memory 32 receives encoded video content 34 comprising I-units, P-units and B-units (41). Transcoder 35 transcodes the encoded video content 34 into transcoded video content 36 comprising I-units and P-units (42). In particular, for one or more B-units in encoded video content 34, transcoder 35 eliminates temporal predictions referring to one of two lists associated with a B-video block, generates an augmented residual block, and adds the augmented residual block to original residual block associated with the B-video block to define a residual block for a P-video block. As described herein, the augmented residual block may comprise approximately half of a difference between a first reference video block from a first one of the two lists and a second reference video block from a second one of the two lists.

Transcoder 35 then outputs the transcoded video content 36 (43). A transmitter can then transmit the transcoded video content (44). For example, referring again to FIG. 1, multiplex module 18 may combine various channels or flows of transcoded video content 8 into a multicast, modulator 22 may modulate the multicast, and transmitter 24 may transmit the multicast to subscriber devices 12 via wireless channels 17. Alternatively, rather than output the transcoded video content, the transcoded content could simply be stored locally for later use or later transmission.

Figure 4:
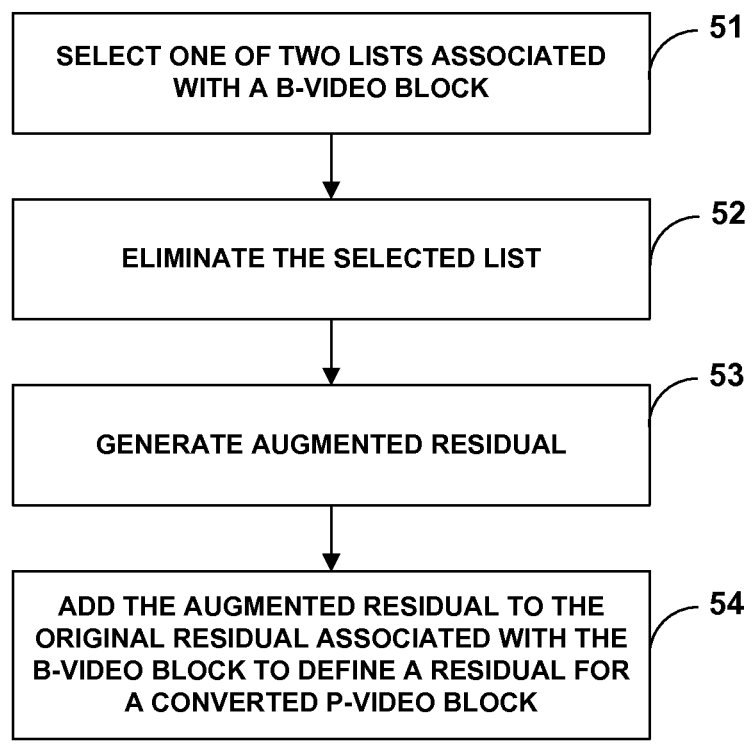

FIG. 4 is another flow diagram illustrating the transcoding process in greater detail. In accordance with FIG. 4, transcoder 35 may select one of two lists associated with a B-video block (51), and may eliminate the selected list (52). For example, the list may be selected based on spatial proximity or temporal proximity of the list data to the current video block being coded. In this case, the list with the most temporally or spatially distant data may be eliminated. Alternatively, video transcoder 35 may perform more complex coding techniques to determine which of the two lists is best suited for elimination. Eliminating one of the lists of data, as described herein, may simply refer to eliminations of references to the list. Thus, the actual data in the "eliminated" list may not itself be deleted from memory, but instead, any references to the eliminated list may be removed for the transcoded blocks in favor of the references to only one of the lists and creation of the augmented residual.

Transcoder 35 generates an augmented residual (53), which may comprise a block of data to augment the original residual value following elimination of prediction to one of the lists. In particular, as described herein, the augmented residual may comprise a block of adjustment values that can be used to augment the original residual value following elimination of prediction to one of the lists. In accordance with this disclosure, the augmented residual can be approximated based on actual data associated with the lists, which may substantially improve the ability to approximate the augmented residual relative to conventional techniques. For example, the augmented residual may comprise approximately half of a difference between a first reference video block from a first one of the two lists and a second reference video block from a second one of the two lists. Once the augmented residual is generated (53), transcoder 35 adds the augmented residual to the original residual associated with the B-video block to define a residual for a converted P-video block (54).

Based on the teachings described herein, one skilled in the art should appreciate that an aspect disclosed herein may be implemented independently of any other aspects and that two or more of these aspects may be combined in various ways. The techniques described herein may be implemented in hardware, possibly implementing software or firmware with the hardware. If implemented in hardware, the techniques may be realized using digital hardware, analog hardware or a combination thereof. If implemented in software, the techniques may be realized at least in part by one or more stored or transmitted instructions or code on a computer-readable medium. Computer-readable media may include computer storage media, communication media, or both, and may include any medium that facilitates transfer of a computer program from one place to another. A storage media may be any available media that can be accessed by a computer.

By way of example, and not limitation, such computer-readable media can comprise computer-readable storage media such as RAM, such as synchronous dynamic random access memory (SDRAM), read-only memory (ROM), non-volatile random access memory (NVRAM), programmable read-only memory PROM, erasable programmable read-only memory (EPROM), electrically erasable programmable read-only memory (EEPROM), FLASH memory, CD-ROM or other optical disk storage, magnetic disk storage or other magnetic storage devices, or any other tangible medium that can be used to carry or store desired program code in the form of instructions or data structures and that can be accessed by a computer.

Also, any connection is properly termed a computer-readable medium. For example, if the software is transmitted from a website, server, or other remote source, it may be sent using a computer-readable transmission medium such as a network cable, coaxial cable, fiber optic cable, twisted pair, digital subscriber line (DSL), or wireless technologies such as infrared, radio, and microwave, then the network cable, coaxial cable, fiber optic cable, twisted pair, DSL, or wireless technologies such as infrared, radio, and microwave, each of which may be a transmission medium. The terms disk and disc, as used herein, includes compact disc (CD), laser disc, optical disc, digital versatile disc (DVD), floppy disk and blu-ray disc where disks usually reproduce data magnetically, while discs reproduce data optically, e.g., with lasers. Combinations of the above should also be included within the scope of computer-readable media.

A computer program product, as disclosed herein, includes a computer-readable storage medium as well as any materials associated with the computer-readable storage medium, including packaging materials within which the computer-readable storage medium is packaged. The code associated with a computer-readable storage medium of a computer program product may be executed by a computer, e.g., by one or more processors, such as one or more digital signal processors (DSPs), general purpose microprocessors, ASICs, FPGAs, or other equivalent integrated or discrete logic circuitry. In some aspects, the functionality described herein may be provided within dedicated software modules or hardware modules configured for encoding, decoding, modulating and transmitting data, or incorporated in a combined CODEC and wireless modulator/transmitter.

Various aspects have been described. These and other aspects are within the scope of the following claims.

The invention claimed is:

1. A method of transcoding video content comprising:
receiving encoded video content that includes a first set of coded units comprising I-units, P-units and B-units; and
transcoding the encoded video content into transcoded video content that includes a second set of coded units comprising I-units and P-units,
wherein transcoding includes converting the B-units in the first set into one or more of the P-units in the second set, wherein the B-units include B-video blocks that include temporal predictions based on two different lists of predictive data and include P-video blocks that include temporal predictions based on one list of predictive data, and wherein the P-units include P-video blocks and do not include B-video blocks,
wherein for one or more of the B-units in the first set, converting includes:
selecting a motion vector and a corresponding reference frame associated with one of the two different lists for which to eliminate temporal predictions for an encoded video frame that includes a particular B-video block to be converted to a corresponding P-video block based on temporal proximity of the selected corresponding reference frame relative to the encoded video frame that includes the particular B-video block;
eliminating temporal predictions from the one of the two different lists associated with the particular B-video block;
generating an augmented residual block; and
adding the augmented residual block to an original residual block associated with the particular B-video block to define a residual block for a converted P-video block,
wherein generating the augmented residual block is based on differences between values of the first reference video block from a first one of the two different lists and values of a second reference video block from a second one of the two different lists.

2. The method of claim 1, wherein converting further comprises selecting the motion vector and the corresponding reference frame associated with the one of the two lists for which to eliminate temporal predictions for the encoded video frame that includes the particular B-video block based at least in part on spatial proximity of video data in the lists relative to the encoded video frame that includes the particular B-video block.

3. The method of claim 2, wherein the one of the two lists for which to eliminate temporal predictions for the encoded video frame that includes the particular B-video block has first video data that is spatially farther from the encoded video frame that includes the particular B-video block than second video data associated with another one of the two lists that is to be retained as a temporal reference for a transcoded video frame that includes the converted P-video block.

4. The method of claim 1, further comprising defining a level of quantization for the converted P-video block to be different than a level of quantization of the particular B-video block.

5. The method of claim 1, further comprising defining a level of quantization for the augmented residual block to be different than a level of quantization of the original residual block.

6. The method of claim 1, wherein generating the augmented residual block is based on approximately half the difference between the first reference video block and a second reference video block.

7. The method of claim 1, wherein the I-units, P-units and B-units comprise either video frames or slices of video frames.

8. The method of claim 1, wherein the first set of coded units comply with a first video coding standard and the second set of coded units comply with a second video coding standard.

9. The method of claim 8, wherein the first video coding standard comprises an ITU-T H.264/AVC Main Profile (MP), and the second video coding standard comprises an ITU-T H.264/AVC Baseline Profile (BP), wherein ITU-T refers to International Telecommunications Union-Telecommunication and AVC refers to Advanced Video Coding.

10. The method of claim 1, wherein converting the B-units in the first set into one or more of the P-units in the second set occurs in a transform domain.

11. The method of claim 1, wherein for one or more of the B-units in the first set, the method further includes converting an I-video block that is spatially predicted based on reconstructed pixel values associated with the particular B-video block to an I-video block that is spatially predicted based on reconstructed pixel values associated with the converted P-video block.

12. An apparatus for transcoding video content, the apparatus comprising:
 a receive module that receives encoded video content that includes a first set of coded units comprising I-units, P-units and B-units; and
 an encoder that transcodes the encoded video content into transcoded video content that includes a second set of coded units comprising I-units and P-units,
 wherein in transcoding, the encoder converts the B-units in the first set into one or more of the P-units in the second set, wherein the B-units include B-video blocks that include temporal predictions based on two different lists of predictive data and include P-video blocks that include temporal predictions based on one list of predictive data, and wherein the P-units include P-video blocks and do not include B-video blocks,
 wherein for one or more of the B-units in the first set, in converting the B-units the encoder:
  selects a motion vector and a corresponding reference frame associated with one of the two different lists for which to eliminate temporal predictions for an encoded video frame that includes a particular B-video block to be converted to a corresponding P-video block based on temporal proximity of the selected corresponding reference frame relative to the encoded video frame that includes the particular B-video block;
  eliminates temporal predictions from the one of the two different lists associated with the particular B-video block;
  generates an augmented residual block; and
  adds the augmented residual block to an original residual block associated with the particular B-video block to define a residual block for a converted P-video block, and
 wherein the augmented residual block is generated based on differences between values of the first reference video block from a first one of the two different lists and values of a second reference video block from a second one of the two different lists.

13. The apparatus of claim 12, wherein in converting the B-units, the encoder selects the motion vector and the corresponding reference frame associated with the one of the two lists for which to eliminate temporal predictions for the encoded video frame that includes the particular B-video block based at least in part on spatial proximity of video data in the lists relative to the encoded video frame that includes the particular B-video block.

14. The apparatus of claim 13, wherein the one of the two lists for which to eliminate temporal predictions for the encoded video frame that includes the particular B-video block has first video data that is spatially further from the encoded video frame that includes the particular B-video block than second video data associated with another one of the two lists that is to be retained as a temporal reference for a transcoded video frame that includes the converted P-video block.

15. The apparatus of claim 12, wherein the encoder defines a level of quantization for the converted P-video block to be different than a level of quantization of the particular B-video block.

16. The apparatus of claim 12, wherein the encoder defines a level of quantization for the augmented residual block to be different than a level of quantization of the original residual block.

17. The apparatus of claim 12, wherein generating the augmented residual block is based on approximately half the difference between the first reference video block and the second reference video block.

18. The apparatus of claim 12, wherein the I-units, P-units and B-units comprise either video frames or slices of video frames.

19. The apparatus of claim 12, wherein the first set of coded units comply with a first video coding standard and the second set of coded units comply with a second video coding standard.

20. The apparatus of claim 19, wherein the first video coding standard comprises an ITU-T H.264/AVC Main Profile (MP), and the second video coding standard comprises an ITU-T H.264/AVC Baseline Profile (BP), wherein ITU-T refers to International Telecommunications Union-Telecommunication and AVC refers to Advanced Video Coding.

21. The apparatus of claim 12, wherein the encoder converts the B-units in the first set into one or more of the P-units in the second set within a transform domain.

22. The apparatus of claim 12, wherein for one or more of the B-units in the first set, the encoder converts an I-video block that is spatially predicted based on the reconstructed pixel values associated with the particular B-video block to an I-video block that is spatially predicted based on reconstructed pixel values associated with the converted P-video block.

23. The apparatus of claim 12, wherein the apparatus comprises one of an integrated circuit and a microprocessor.

24. The apparatus of claim 12, wherein the apparatus comprises a transcoding device that further comprises a transmitter that transmits the transcoded video content to one or more other devices.

25. A device for transcoding video content, the device comprising:
 means for receiving encoded video content that includes a first set of coded units comprising I-units, P-units and B-units; and
 means for transcoding the encoded video content into transcoded video content that includes a second set of coded units comprising I-units and P-units;
 wherein the means for transcoding includes means for converting the B-units in the first set into one or more of the P-units in the second set, wherein the B-units include B-video blocks that include temporal predictions based on two different lists of predictive data and include P-video blocks that include temporal predictions based on one list of predictive data, and wherein the P-units include P-video blocks and do not include B-video blocks,
 wherein for one or more of the B-units in the first set, the means for converting includes:
  means for selecting a motion vector and a corresponding reference frame associated with one of the two different lists for which to eliminate temporal predictions for an encoded video frame that includes a particular B-video block to be converted based on temporal proximity of the selected corresponding reference frame relative to the encoded video frame that includes the particular B-video block;
  means for eliminating temporal predictions from the one of the two different lists associated with the particular B-video block;
  means for generating an augmented residual block; and means for adding the augmented residual block to an original residual block associated with the particular B-video block to define a residual block for a converted P-video block, and
wherein the augmented residual block is generated based on differences between values of the first reference video block from a first one of the two different lists and values of a second reference video block from a second one of the two different lists.

26. The device of claim 25, wherein the means for converting further comprises means for selecting the motion vector and the corresponding reference frame associated with the one of the two lists for which to eliminate temporal predictions for the encoded video frame that includes the particular B-video block based at least in part on spatial proximity of video data in the lists relative to the encoded video frame that includes the particular B-video block.

27. The device of claim 26, wherein the one of the two lists for which to eliminate temporal predictions for the encoded video frame that includes the particular B-video block has first video data that is spatially further from the encoded video frame that includes the particular B-video block than second video data associated with another one of the two lists that is to be retained as a temporal reference for a transcoded video frame that includes the converted P-video block.

28. The device of claim 25, further comprising means for defining a level of quantization for the converted P-video block to be different than a level of quantization of the particular B-video block.

29. The device of claim 25, further comprising means for defining a level of quantization for the augmented residual block to be different than a level of quantization of the original residual block.

30. The device of claim 25, wherein generating the augmented residual block is based on approximately half the difference between the first reference video block and the second reference video block.

31. The device of claim 25, wherein the I-units, P-units and B-units comprise either video frames or slices of video frames.

32. The device of claim 25, wherein the first set of coded units comply with a first video coding standard and the second set of coded units comply with a second video coding standard.

33. The device of claim 32, wherein the first video coding standard comprises an ITU-T H.264/AVC Main Profile (MP), and the second video coding standard comprises an ITU-T H.264/AVC Baseline Profile (BP), wherein ITU-T refers to International Telecommunications Union-Telecommunication and AVC refers to Advanced Video Coding.

34. The device of claim 25, wherein the means for converting the B-units in the first set into one or more of the P-units in the second set converts in a transform domain.

35. The device of claim 25, further comprising means for converting an I-video block that is spatially predicted based on reconstructed pixel values associated with the particular B-video block to an I-video block that is spatially predicted based on reconstructed pixel values associated with the converted P-video block.

36. A non-transitory computer-readable storage medium comprising instructions that upon execution cause a processor to:
upon receiving encoded video content that includes a first set of coded units comprising I-units, P-units and B-units,
transcode the encoded video content into transcoded video content that includes a second set of coded units comprising I-units and P-units,
wherein in transcoding, the instructions cause the processor to convert the B-units in the first set into one or more of the P-units in the second set, wherein the B-units include B-video blocks that include temporal predictions based on two different lists of predictive data and include P-video blocks that include temporal predictions based on one list of predictive data, and wherein the P-units include P-video blocks and do not include B-video blocks,
wherein for one or more of the B-units in the first set, in converting the B-units, the instructions cause the processor to:
select a motion vector and a corresponding reference frame associated with one of the two different lists for which to eliminate temporal predictions for an encoded video frame that includes a particular B-video block based on temporal proximity of the selected corresponding reference frame relative to the encoded video frame that includes the particular B-video block;
eliminate temporal predictions from the one of the two different lists associated with the particular B-video block;
generate an augmented residual block; and
add the augmented residual block to an original residual block associated with the particular B-video block to define a residual block for a converted P-video block, and
wherein the augmented residual block is generated based on differences between values of the first reference video block from a first one of the two different lists and values of a second reference video block from a second one of the two different lists.

37. The non-transitory computer-readable storage medium of claim 36, wherein in converting the B-units, the instructions cause the processor to select the motion vector and the corresponding reference frame associated with the one of the two lists for which to eliminate temporal predictions for the encoded video frame that includes the particular B-video block based at least in part on spatial proximity of video data in the lists relative to the encoded video frame that includes the particular B-video block.

38. The non-transitory computer-readable storage medium of claim 37, wherein the one of the two lists for which to eliminate temporal predictions for the encoded video frame that includes the particular B-video block has first video data that is spatially farther from the encoded video frame that includes the particular B-video block than second video data associated with another one of the two lists that is to be retained as a temporal reference for a transcoded video frame that includes the converted P-video block.

39. The non-transitory computer-readable storage medium of claim 36, wherein the instructions cause the processor to define a level of quantization for the converted P-video block to be different than a level of quantization of the particular B-video block.

40. The non-transitory computer-readable storage medium of claim 36, wherein the instructions cause the processor to define a level of quantization for the augmented residual block to be different than a level of quantization of the original residual block.

41. The non-transitory computer-readable storage medium of claim 36, wherein the augmented residual block is generated based on approximately half the difference between the first reference video block and the second reference video block.

42. The non-transitory computer-readable storage medium of claim 36, wherein the I-units, P-units and B-units comprise either video frames or slices of video frames.

43. The non-transitory computer-readable storage medium of claim 36, wherein the first set of coded units comply with a first video coding standard and the second set of coded units comply with a second video coding standard, wherein the first video coding standard comprises an ITU-T H.264/AVC Main Profile (MP), and the second video coding standard comprises an ITU-T H.264/AVC Baseline Profile (BP), wherein ITU-T refers to International Telecommunications Union-Telecommunication and AVC refers to Advanced Video Coding.

44. The non-transitory computer-readable storage medium of claim 36, wherein the instructions cause the processor to convert the B-units in the first set into one or more of the P-units in the second set within a transform domain.

45. The non-transitory computer-readable storage medium of claim 36, wherein for one or more of the B-units in the first set, the instructions cause the processor to convert an I-video block that is spatially predicted based on reconstructed pixel values associated with the particular B-video block to an I-video block that is spatially predicted based on reconstructed pixel values associated with the converted P-video block.

46. The method of claim 1, wherein the converted P-video block comprises a forward predictive macroblock with respect to the first reference video block identified by the motion vector.

47. The method of claim 1, wherein the converted P-video block comprises a backward predictive macroblock with respect to the second reference video block.

48. The method of claim 1, wherein the one of the two lists for which to eliminate temporal predictions for the encoded video frame that includes the particular B-video block has first video data that is temporally farther from the encoded video frame that includes the particular B-video block than second video data associated with another one of the two lists that is to be retained as a temporal reference for a transcoded video frame that includes the converted P-video block.

49. The method of claim 5, further comprising adjusting at least one of the level of quantization of the augmented residual block and the level of quantization of the original residual block to be equal to one another.

50. The method of claim 1, wherein the first set of coded units comply with a first profile of a video coding standard and the second set of coded units comply with a second profile of the video coding standard.

51. The method of claim 50, wherein the first profile of the video coding standard comprises an ITU-T H.264/AVC Extended Profile (XP), and the second profile of the video coding standard comprises an ITU-T H.264/AVC Baseline Profile (BP), wherein ITU-T refers to International Telecommunications Union-Telecommunication and AVC refers to Advanced Video Coding.

52. The method of claim 1, further comprising defining a level of quantization for the particular B-video block to be equal to a level of quantization for the converted P-video block.

* * * * *